United States Patent [19]

Kramer

[11] 4,112,899

[45] Sep. 12, 1978

[54] PRESSURIZING FUEL RAM AIR CHARGER

[75] Inventor: John B. Kramer, Houston, Tex.

[73] Assignee: Allied Chemical Corporation, Morristown, N.J.

[21] Appl. No.: 757,803

[22] Filed: Jan. 7, 1977

Related U.S. Application Data

[63] Continuation of Ser. No. 655,196, Feb. 4, 1976, which is a continuation of Ser. No. 162,885, Jul. 15, 1971, abandoned, which is a continuation-in-part of Ser. No. 19,950, Mar. 15, 1970, Pat. No. 3,664,315.

[51] Int. Cl.² .................. F02M 39/00; F02B 3/00
[52] U.S. Cl. .................. 123/139 AW; 239/533.12
[58] Field of Search ............... 163/119 R, 122 E, 121, 163/120, 139 AW, 127, 124; 261/DIG. 12; 239/533.12, 419.5

[56] References Cited

U.S. PATENT DOCUMENTS

| 1,314,948 | 9/1919 | Cole | 123/119 R |
| 2,322,991 | 6/1943 | Wunsch et al. | 123/122 |
| 3,618,579 | 11/1971 | Varran | 123/122 |

Primary Examiner—Ronald B. Cox
Attorney, Agent, or Firm—Michael S. Jarosz; Patrick L. Henry

[57] ABSTRACT

Method and apparatus for introducing gasoline liquid into the air intake system of an internal combustion engine.

5 Claims, 3 Drawing Figures

PRESSURIZING FUEL RAM AIR CHARGER

This is a continuation of application Ser. No. 655,196, filed Feb. 4, 1976, which is a continuation of Ser. No. 162,885, filed July 15, 1971, now abandoned which in turn is a continuation-in-part of U.S. application Ser. No. 19,950, filed Mar. 15, 1970, now U.S. Pat. No. 3,664,315.

BACKGROUND OF THE INVENTION

This invention relates to the introduction of gasoline mixed with air into an internal combustion engine, and is a continuation in part of U.S. application Ser. No. 19,950 filed 3/16/70 now U.S. Pat. No. 3,664,315. More particularly, this invention relates to the impingement of gasoline on the narrowest point of the venturi so as to entrain air for introduction into the engine air intake system.

The injection of atomized gasoline (liquid), as will be described, for standardly introduced gasoline or the other fuels in the internal combustion engine leads to certain specific advantages; among them the reduction of emissions from the engine, the better burning of the fuel, and the improved horsepower because of homogenous mixing before the manifold. It is further advantageous to supercharge the engine by introducing air and atomized droplets of gasoline into the mixture introduced into the engine air intake system of the standard automobile engine.

It is an object of the invention, therefore, to provide a method and apparatus for introducing air and atomized droplets of gasoline into the air intake system of the internal combustion engine.

Other objects and advantages of the invention will become more apparent upon reading the following detailed description.

DESCRIPTION OF THE INVENTION

Generally, the invention comprises atomizing liquid gasoline, into droplets, and entraining air with it at a point close to the narrowest point of venturi, as will be more fully descirbed later, followed by introduction into the engine air intake system. A specific design for efficient entrainment of the air with the droplets and introduction thereof into the carburetor will also be described in detail in the description that follows; it being understood that although the description is made with relation to a carburetor arrangement, it is similarly applicable to the air intake system of, for example, a diesel engine.

The invention will now be described in greater detail with relation to the following drawings.

The invention will now be described in detail. Reference will first be made to a method of and apparatus for introducing LPG, as described in said U.S. Pat. No. 3,664,315, and then the invention will be described in detail referring to modifications of said method and apparatus for liquid gasoline.

Figure 1:
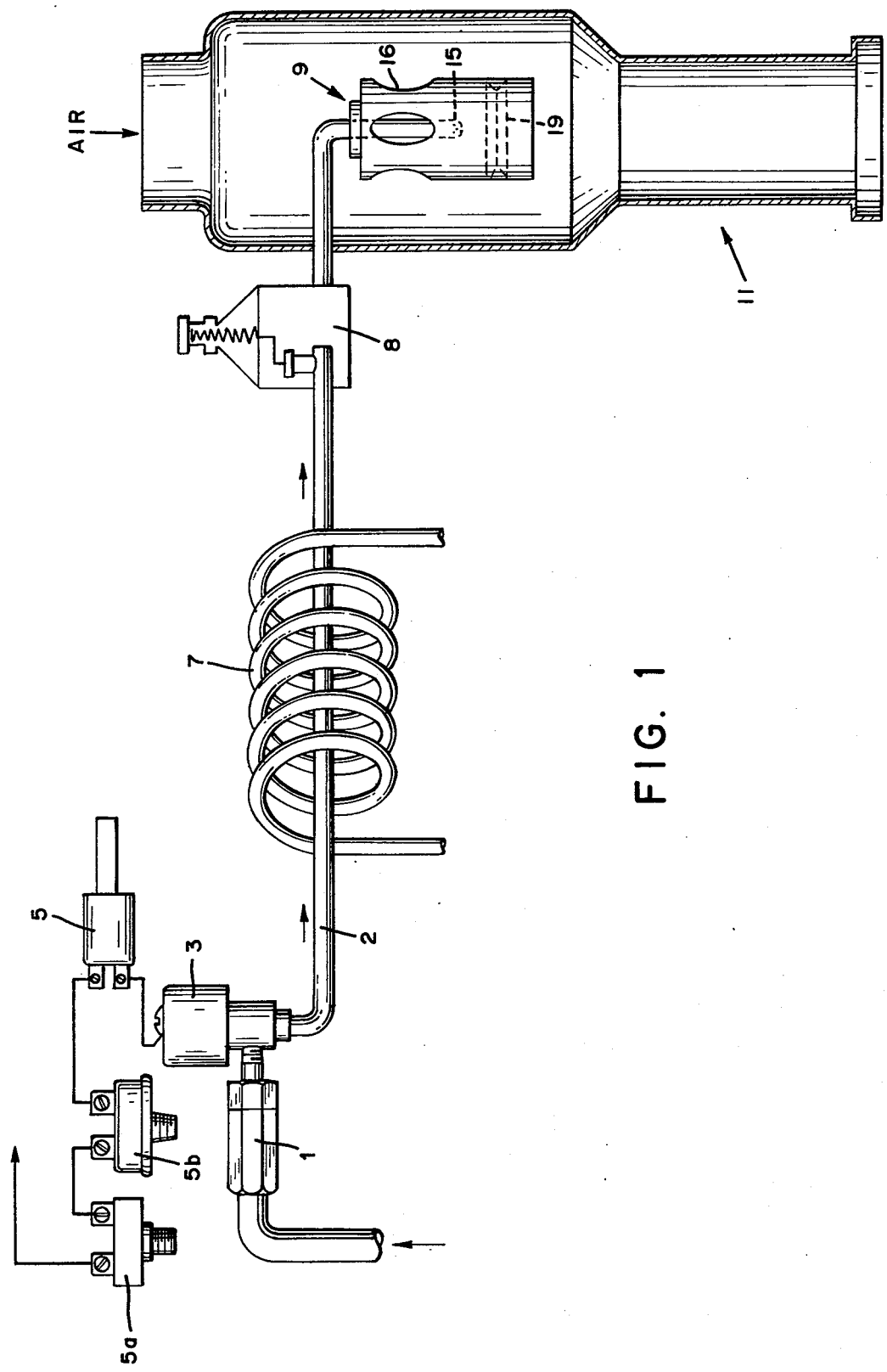
FIG. 1 is a schematic showing the method of introducing LPG.

Referring to FIG. 1, vapor or liquid and vapor from a storage tank or other source (not shown), say for example, propane, after being filtered, as shown diagrammatically at 1 is routed through line 2 toward the air intake system, which in this embodiment consists of carburetor (11). Flow of the LPG vapor or liquid partially vaporized may, for example, be controlled by energization of the throttle and thus switch (5), provided that there is also energization of a double switch, for example the double switch shown schematically as dash toggle switch 5a, connection to the ignition, and oil pressure switch 5b. Thus with dash toggle switch 5a in the energization position, and oil pressure switch 5b energized as a result of oil pressure reaching a predetermined level, actuation of the throttle and thus switch 5 will allow the flow of vapor through solenoid lockoff device (3), as shown.

Said vapor or liquid and vapor flows through the line 2 and is heated, and thus fully vaporized and raised in pressure, by hot water or other heated substance contained in the coil (7) surrounding said line. The temperature of the medium in the coil (7) is preferably in the range of 175° to 195° F. The heated vapor is then conveyed by line 2 to a pressure regulator 8, which regulates the pressure to that pressure desired, in one embodiment in the range of 250 to 350 pounds per square inch, and in one embodiment, about 300 pounds per square inch. Such a regulator will be required, for example, because the heating of the vapor preceding such regulation in the temperature range indicated will raise the pressure of LPG vapor to a high level, in one embodiment above 350 pounds per square inch. Furthermore the regulator 8 is desirable in the disclosed system so as to insure metering of the vapor to the air stream at a constant, predetermined rate of flow, rather than a varying rate of flow. From the regulator, the vapor is introduced into the air entrainment gas injector (9) located within the air intake system (shown diagramatically at 11) of an internal combustion engine, and is emitted at the nozzle (15) to impinge on the narrowest point of the venturi (19) (see FIG. 2) to intermix with and/or entrain air entering through the intake ports (15) to then be carried into the air intake system or carburetor (11) through the ports (17) and the venturi (19). Further mixture, that is secondary mixture, of the vapor and the entrained air will take place after the venturi (19) as a result of the creation of the negative pressure produced by the use of the venturi effect. Thus, the vapor is introduced in such a manner as to insure the entrainment both before and after the venturi of large quantities of air.

Figure 2:
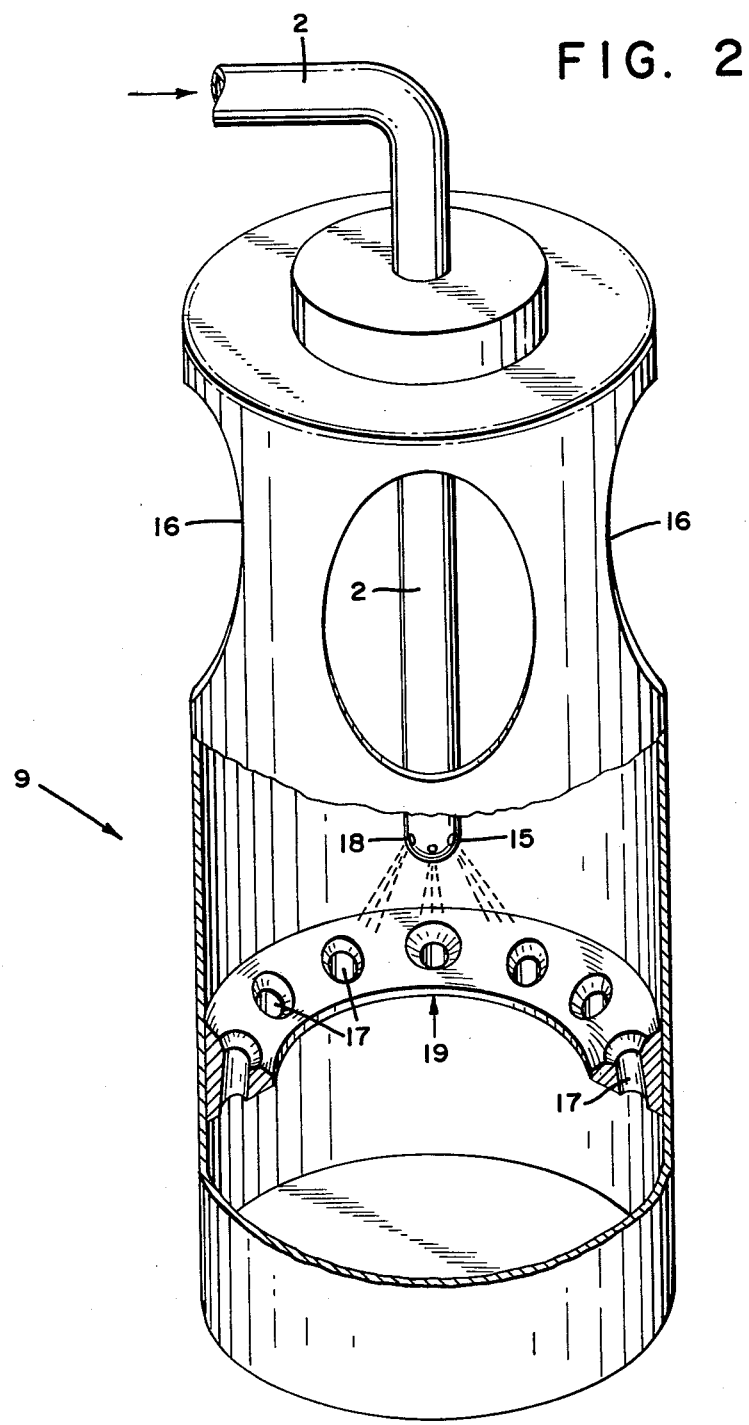
FIG. 2 is a detailed showing of an efficient method of air entrainment.

Referring to FIGS. 1 and 2, it will be noted that the openings 18 in the nozzle 15 are located to be so adjacent the narrowest point (the point of constriction) of the venturi and that the gas exiting from the openings (18) must substantially impinge on the point at the point of constriction of the venturi (19) when exiting from the nozzle, thus providing for the most effective homogeneous mixing and movement of the gas and entrained air into the air intake system or carburetor. In the particular embodiment illustrated, the configuration or the nozzle is shown as convex with four, say, #80 holes provided therein through which the gas exits from the nozzle 15.

The mixing ports (17) leading to the carburetor through which additional air passes are placed at approximately a 20° to 25° outward angle (from the axis of line 2) in the venturi, which, as previously described, allows a secondary entrainment of air by a portion of the air swirling slightly and impinging on the lower edge of the air entrainment gas injector 9. Secondary air will also be drawn alongside of the air entrainment gas injector. Said secondary air will homogeneously mix with the vapor and air as a result of the use of the venturi effect.

Figure 3:
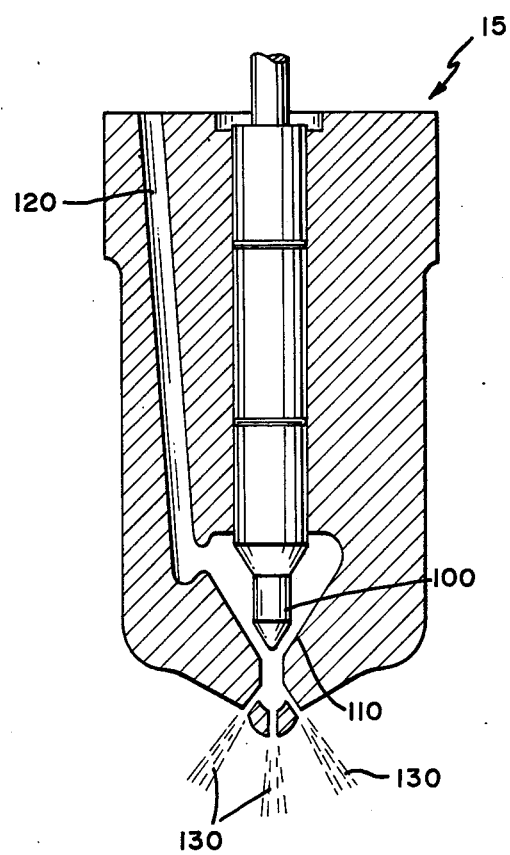
FIG. 3 shows a detail of the gasoline atomization.

As a result of the employment of the method of entraining air with LPG described in the preceding paragraphs, LPG may be introduced into an internal combustion engine either as a substitute for gasoline or in addition to it or in addition to diesel fuel with the advantages previously discussed. The specific design of entraining discussed with relation to FIG. 2 produces a most efficient method of entraining air with the LPG vapor. Of course, liquefied Petroleum gas includes, but is not limited to, propane or butane or other LPG gases or mixtures thereof. Natural gas (compressed or liquefied) might also be used as the source of the vapor.

Where liquid gasoline is introduced into the system as discussed above instead of LPG or natural gas, the gasoline may be partially vaporized by heat exchange as at 7, (through use of exhaust gases or engine coalant, for example) as discussed above. The liquid part of the partially vaporized gas then is suitable for atomization and air entrainment before reaching the carburetor 11, as described below. However, it is preferable not to vaporize at least a dominant portion of the gasoline through heat exchange, and even more preferably not to vaporize substantially all of it. The gasoline liquid is then treated by the introduction of an atomizing device at the end of the nozzle 15 in place of the hole 18, as shown in FIG. 3. The atomizing device, which is known in the art includes a cone 100 restricting the orifice 110 so that liquid gasoline entering from path 120 is broken up on passing through parts 130 into tiny, "atomized" droplets. These droplets entrain a maximum of air with the fuel due to the grater surface area thereof, and homogeneous and evenly distributed mixing of fuel and air before the manifold results. Because of greater air entrainment and more even distribution through gasoline atomization, lower emissions and greater horespower occur.

It is intended that applicant's invention be limited to the following claims:

I claim:

1. A method of introducing gasoline liquid into the air intake system of an internal combustion engine which comprises atomizing at least a portion of said liquid to droplets at a point of constriction in air entrainment injection means so as to create a substantially maximum venturi effect at said point of constriction, entraining separately introduced air with said atomized liquid droplets at the point of constriction, immediately thereafter subjecting the atomized liquid droplets and said air to mixing at and after the point of constriction by passing the same through mixing ports bypassing said point of constriction, further entraining secondarily supplied air as a result of the mixing, and then moving said atomized liquid droplets and air, homogeneously mixed, for introduction into the internal combustion engine.

2. The method as recited in claim 1, further comprising atomizing at least a dominant portion of said liquid.

3. The method as recited in claim 1, further comprising vaporizing at least some of said liquid to vapor before atomization thereof.

4. The method as recited in claim 1, further comprising atomizing substantially all of such liquid.

5. Apparatus for entraining and mixing air with gasoline liquid comprising air entrainment injector means to be located within the engine air intake system of an internal combustion engine, said means having a point of constriction for the creation of a venturi effect, atomizing nozzle means for injecting atomized gasoline liquid into said air entrainment injector means, said nozzle means located adjacent said point of constriction at an angle so as to create a substantially maximum venturi effect at said point of constriction, intake ports in said air entrainment injector means for introducing air into said means, mixing ports bypassing said point of constriction in said air entrainment injector means to effect substantial homogeneous mixture of air at and after the point of constriction with the atomized liquid, and means for substantially homogeneously mixing secondarily derived air with said substantially homogeneous mixture previously defined.

* * * * *